United States Patent [19]

Kudryavtsev et al.

[11] 4,057,409
[45] Nov. 8, 1977

[54] APPARATUS FOR MAKING CATHODE-RAY TUBE SCREENS WITH INTEGRALLY FORMED CONTOURED FIXTURES

[76] Inventors: Alexandr Alexandrovich Kudryavtsev, Novye Cheremushki, kvartal 34a, korpus 4, kv. 3; Vitaly Mikhailovich Firsov, 9 Parkovaya ulitsa, 8, kv. 25; Evgeny Fedorovich Solinov, Novorogozhskaya ulitsa, 15, korpus 2, kv. 59; Mark Klavdievich Symon, 1 Voikovsky proezd, 12, kv. 4; Pavel Ivanovich Litvinov, Novorogozhskaya ulitsa, 11, korpus 2, kv. 25; Albert Pavlovich Veresov, Novorogozhskaya ulitsa, 14, korpus 2, kv. 54; Ivan Alexandrovich Rybakov, Novorogozhskaya ulitsa, 11, korpus 2, kv. 63; Viktor Timofeevich Trishin, ulitsa Smirnovskaya, 11, kv. 27; Vladimir Mikhailovich Goryannikov, ulitsa Litvina-Sedogo, 3, kv. 24; Vyacheslav Pavlovich Savin, Novorogozhskaya ulitsa, 4, korpus 2, kv. 43, all of Moscow; Igor Georgievich Kashkarov, Dolgoprudny, Vodniki, ulitsa Stantsionnaya, 5, Moskovskaya oblast, all of U.S.S.R.

[21] Appl. No.: 660,467

[22] Filed: Feb. 23, 1976

[51] Int. Cl.² ............... C03C 27/02; C03B 21/00
[52] U.S. Cl. ............... 65/154; 65/102; 65/110; 65/59 A; 65/156
[58] Field of Search ............... 65/154, 306, 78, 156, 65/59 A, 102, 110

[56] References Cited

U.S. PATENT DOCUMENTS

| 2,485,769 | 10/1949 | Phelps | 65/154 X |
|---|---|---|---|
| 2,950,569 | 8/1960 | Chapman | 65/102 |
| 3,021,643 | 2/1962 | Blanding et al. | 65/154 |
| 3,186,812 | 6/1965 | Pfaender | 65/156 X |
| 3,494,756 | 2/1970 | Damm | 65/154 X |
| 3,632,327 | 1/1972 | Matuba | 65/154 X |
| 3,705,026 | 12/1972 | McReynolds et al. | 65/78 X |
| 3,796,557 | 3/1974 | Sponeseler | 65/77 |

*Primary Examiner*—S. Leon Bashore
*Assistant Examiner*—Frank W. Miga
*Attorney, Agent, or Firm*—Lackenbach, Lilling & Siegel

[57] ABSTRACT

An apparatus for making cathode ray tube screens with contoured fixtures comprises an automatic press having a rotary table with moulds radially fixed thereto, as well as a mechanism for moulding the fixtures. This mechanism has a vertically and horizontally displaceable frame carrying heaters and male dies. In operation, the frame is introduced into the mould with a screen blank and then is placed, in turn, in two locked positions in which the screen boards heating and fixture moulding, respectively, are effected.

6 Claims, 6 Drawing Figures

APPARATUS FOR MAKING CATHODE-RAY TUBE SCREENS WITH INTEGRALLY FORMED CONTOURED FIXTURES

The invention relates to the manufacture of cathode-ray envelopes, and more particularly, to an apparatus for making cathode-ray tube screens with fixtures for fixing various elements.

The invention may be the most advantageously used in the manufacture of screens for color kinescopes.

Envelopes of modern cathode-ray tubes (CRT) are formed of several parts interconnected by using soldering or cementing techniques. In some types of CRT, there are provided additional elements, such as a color separation grid (mask) in color kinescopes. For fixing such elements, the screen boards are provided with fixing members (fixtures).

It is known to manufacture screens with fixtures located on the inner surface of the screen boards. The common feature of known methods is the step of securing prefabricated fixture blanks to the boards of a screen premoulded of molten glass.

Fixture blanks are manufactured on special purpose-built machines, and they should be made to a predetermined accuracy. Fixture blanks are made of glass or a metal having thermal expansion coefficient which should be only very slightly different from that of the screen glass.

Screen blanks are made by compression moulding of molten glass in moulds on automatic presses which generally comprise a pressing mechanism, a rotary table with moulds mounted thereto, and means for cooling the pressed moulded screens and moulds.

The screen blanks are connected to the fixture blanks on machines having a table with stops provided with clamps for fixture blanks and heaters, as well as means for positioning screens relative to the table and stops.

The set of equipment for making screens with fixtures also includes conveyor means and lehrs (movable hearth furnaces).

The following reference is now made to the principles of known methods of securing metal fixtures to the screen boards. Screen blanks, which are premoulded in moulds, are placed on a machine for soldering the fixtures in the screen boards. The portions of the screen boards, where fixtures are to be arranged, are heated, whereafter the fixture blanks are inserted into the screen boards. In certain applications, fixture blanks are high-frequency heated and pressed against the screen boards. The heated fixture blanks melt the screen board material and penetrate it. In both cases, the fixture blanks are soldered to the screen boards upon cooling see for example (U.S. Pat. No. 2,928,967, 1956; U.S. Pat. No. 3,004,182, 1958, and U.S. Pat. No. 3,385,989, 1966).

Known in the art is a method of securing glass fixtures to the screen boards. In accordance with this method, the portions of the screen boards, in which the fixtures are to be arranged, and the fixture blanks are heated. After the heating, the fixture blanks are pressed against the heated portions of the screen boards and soldered thereto using the same heaters as those used for heating the fixture blanks.

Known in the art are method and apparatus for soldering metal fixtures in the screen boards see for example (U.S. Pat. No. 3,497,339, 1970).

The apparatus has a horizontal table with four vertical supports for supporting a screen at the inner surface thereof. Two of the supports located in one diagonal of the screen are mounted on a fork suspended to a spring and are used for placing the screen into horizontal position. Movable and fixed board stops are mounted on the table along the periphery of the screen for aligning and locking the screen.

In addition, the apparatus is provided with movable clamps for fixtures and with high-frequency inductors for heating the fixtures.

In soldering fixtures in the screen, which is preliminarily pressed of molten glass, the screen is lowered onto the vertical supports with the boards down. The screen is thus supported with the inner surface thereof by two fixed supports and engages one of the movable supports mounted on the fork. Under the action of the spring, the fork is advanced upwards to rotate the screen about an axis extending through vertices of the fixed supports. The screen is rotated until its inner surface engages both movable vertical supports, that is until the screen is in the horizontal position. Then the movable board stops because the horizontal displacement of the screen to press it against the fixed board stops. The screen is thus placed in the horizontal position, aligned and locked in this position. Subsequently, using the high-frequency inductors, the fixtures preliminarily inserted in the clamps are heated and then forced into the screen boards. After the fixtures are forced in the glass at a required depth, their heating is interrupted. The fixtures are cooled and soldered-in.

The disadvantages of the known methods are the following:

need in making fixture blanks which requires a large number of steps, special purpose-made equipment and materials having thermal expansion coefficient which should be only slightly different from that of the screen material;

need in complicated special purpose-made equipment for securing the fixture blanks to the screen boards, including high-frequency heating equipment;

need in conveyor means for transferring the screen to the fixture securing station;

need in additional steps of removing metal fixtures from rejected screens, because a screen with metal fixtures cannot be charged into a tank furnace for secondary melting.

It is an object of the invention to simplify CRT screen manufacturing process.

Another object of the invention is to lower the cost of screen production.

Still another object of the invention is to improve the quality of the screens.

A further object of the invention is to reduce the number of operational staff in the manufacture of CRT screens.

And finally, it is an object of the invention to reduce labor consumption in making CRT screens.

These and other objects are accomplished by that in a method of making cathode-ray tube screens with fixtures for securing elements inside the screen, comprising the steps of compression moulding of screen blanks in a mould, according to the invention, the method further comprises additionally heating the screen boards at the points, where the fixtures are to be arranged, during the time interval when adhesion forces are still acting between the screen blank and the mould, with subsequent pressing of a moulding tool against the heated portions, and moulding, whereby the fixtures are made integrally with the screen boards.

The above-described method permits the manufacture of CRT screens using a single type of equipment, thus dispensing with special purpose-built machines for soldering-in of fixtures and with making fixtures of materials having specified properties. This enables the reduction of the number of equipment units and operational staff, simplifies the manufacturing process thus lowering the production cost.

During moulding of the fixtures, reduced pressure is preferably provided in the moulding cavity of a moulding tool sufficient to ensure the filling of this cavity with the heated screen blank board material.

The provision of reduced pressure in moulding the fixtures contributes to a better quality of moulding and enables the moulding of fixtures having desired dimensions.

An apparatus for effecting the method comprises an automatic press having a base with a rotary table provided with moulds radially mounted thereto, and a pressing mechanism for making screen blanks, and, according to the invention, the apparatus also comprises a fixture moulding mechanism mounted on the base and having a frame mounting heaters and a moulding tool, the frame being vertically reciprocatable and horizontally swingable with two locked positions in which the heater and the moulding tool are placed, in turn, in face of the points of fixture moulding, the mechanism for moulding the fixtures having means for displacing the moulding tool to the points of moulding of the fixtures.

The apparatus according to the invention may be made on the basis of existing automatic presses with only low expenses for the manufacture and assembly of the mechanism for moulding the fixtures.

In accordance with one embodiment, the invention provides a moulding tool comprising a die having a moulding cavity with the surface congruent with the fixture surface, and the apparatus also has a vacuum source communicating with said cavity.

In accordance with another embodiment of the invention, a moulding tool may comprise a die having a moulding projection with the surface congruent with the fixture surface.

This shape of the die is required for moulding the fixtures in the form of recesses in the screen boards.

The number of heaters and moulding tools in the mechanism for moulding the fixtures preferably corresponds to the number of fixtures to be made in the screen. This provides for reduction of time for making a screen with fixtures by concurrently moulding all fixtures.

Other objects and advantages of the invention will become apparent from the following detailed description of the embodiments thereof with reference to the accompanying drawings, in which.

Figure 1:
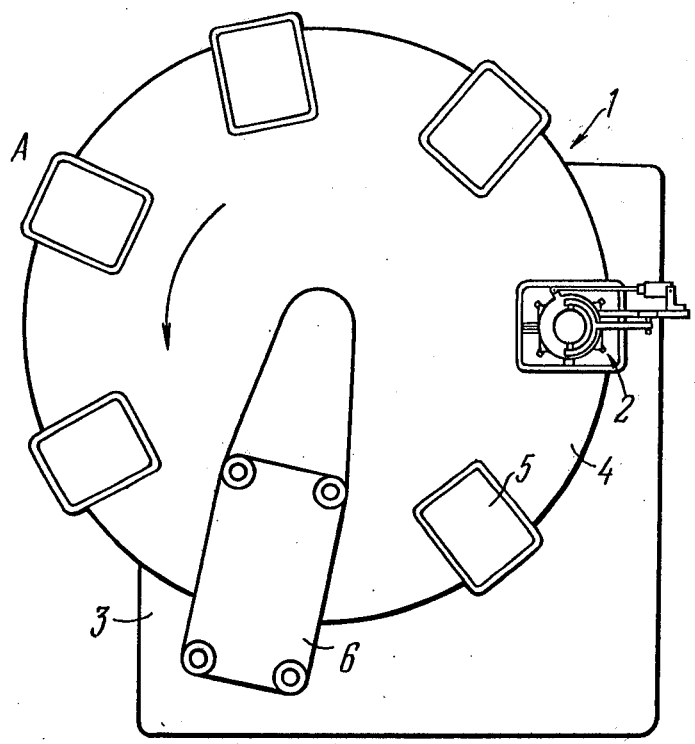
FIG. 1 is a plan view of an apparatus for effecting the method according to the invention.

The apparatus according to the invention is designed for making screens having four fixtures for securing a color separation grid (mask) and comprises an automatic press 1 (FIG. 1) and a mechanism 2 for moulding the fixtures.

The automatic press may comprise any available modern automatic press suitable for making screen blanks. Therefore, the construction of the press elements will not be described herein in details because it does not constitute any subject of our claims.

Figure 2:
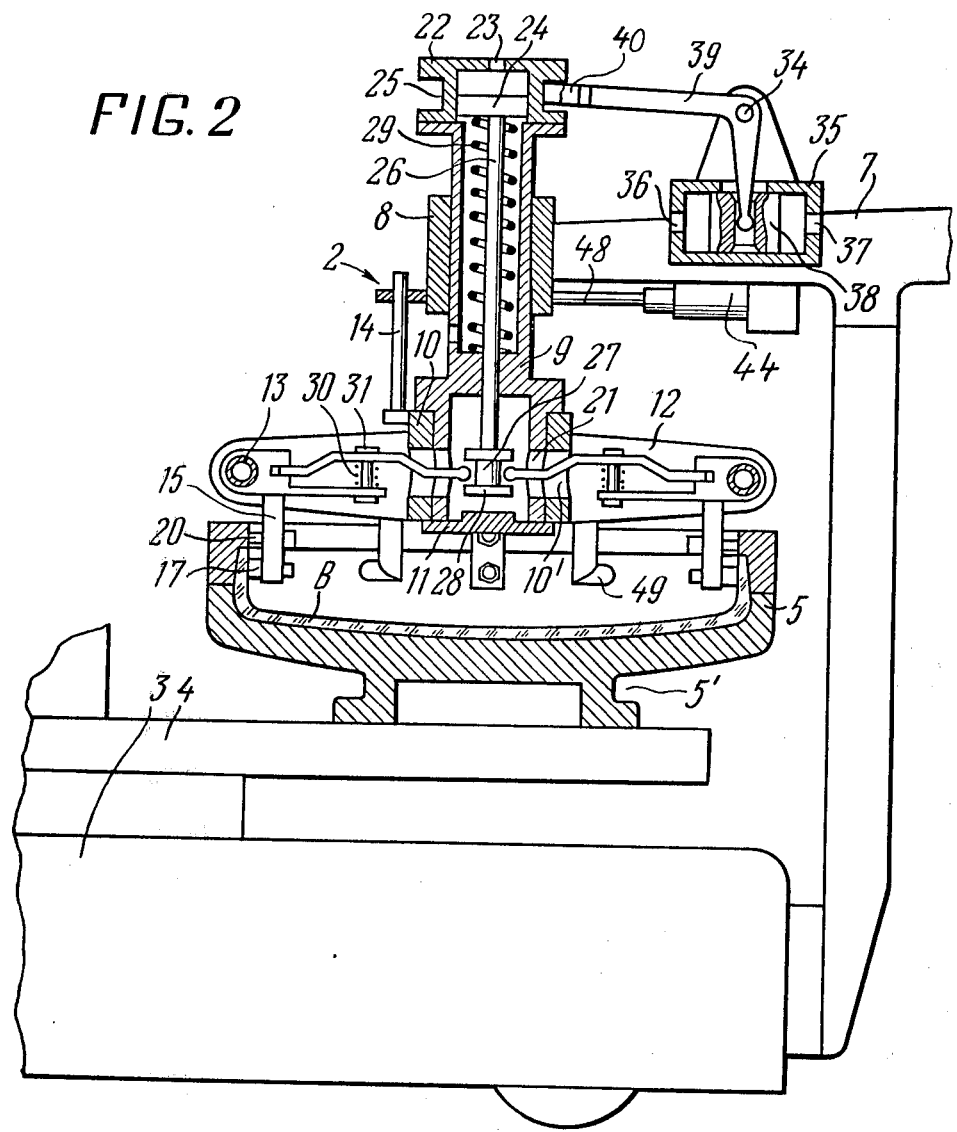
FIG. 2 shows a fixture moulding mechanism in a vertical section.
Figure 3:
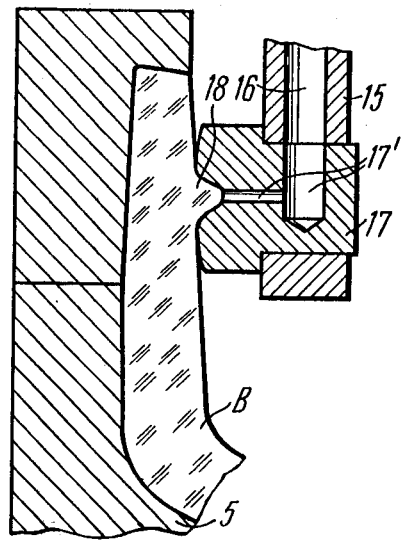
FIGS. 3 and 4 show vertical sections of a portion of the screen with a fixture.

The automatic press 1 (FIG. 1) comprises a base 3, a rotary table 4 mounted thereon and having moulds 5 with legs 5' attached thereto, a pressing mechanism 6 and means for cooling the pressed screen blanks and moulds (not shown in the drawings). The mechanism 2 for moulding of the fixtures is connected to the automatic press 1 by means of a mounting bracket 7 (FIG. 2) secured to the base 3. The mounting bracket 7 mounts a sleeve 8 accommodating a movable casing 9 of the mechanism 2. A bushing 10 with openings 10' is secured to the casing 9, and the bushing has a cover 11. Four frames 12 with hollow axles 13 and a pin 14 are fixed to the bushing 10. The axles 13 support levers 15 having passages 16 (FIG. 3). Moulding tools — dies 17 with passages 17' are fixed to the levers 15. The passages 16 and 17' are connected to a vacuum source (not shown). The surface of the moulding cavity (not shown) of the dies 17 is congruent with the surface of fixtures 18 being moulded.

Figure 4:
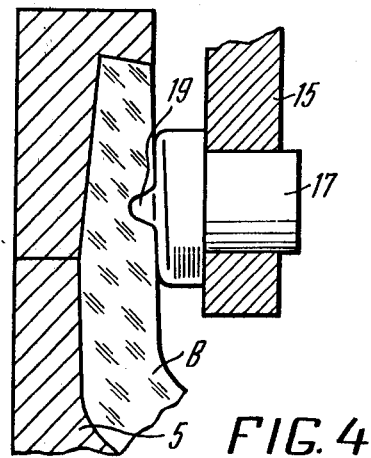

The fixtures may also comprise recesses in the screen boards, and in this case the die 17 will have a moulding projection 19 having the surface which is congruent with the surface of the recess being moulded (FIG. 4).

Figure 5:
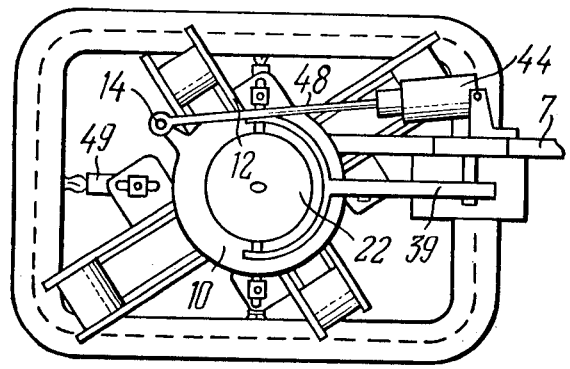
FIG. 5 is a plan view of the mechanism for moulding the fixtures at the moment of heating the screen boards.
Figure 6:
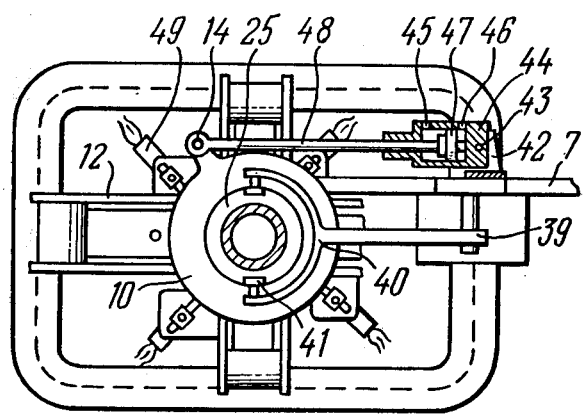
FIG. 6 is a plan view of the mechanism for moulding the fixtures at the moment of moulding the fixtures.

The levers 15 (FIG. 2) are provided with adjustment screws 20 limiting the travel of the levers 15. The ends of the levers 15 extend through the openings 10' of the bushing 10 and openings 21 of the casing 9 to enter the interior of the casing 9. The casing 9 mounts a cylinder 22 having a port 23. The cylinder is intended for pivoting the levers 15. A piston 24 is accommodated in the cylinder 22 having an external annular groove 25. The piston 24 is connected to a piston rod 26 having a member in the form of a spool 27 with jaws 28. The casing 9 accommodates a compression spring 29 bearing against the piston 24. The ends of the levers 15 made of two parts interconnected, with interposition of springs 30, by means of bolts 31, are received in the space between the jaws 28 of the spool 27. The mounting bracket 7 has an axle 34 and a cylinder 35 with ports 36 and 37. The cylinder 35 accommodates a piston 38 connected to an L-shaped lever 39 which is pivotable on the axle 34. The cylinder 35 and the lever 39 are used for lifting and lowering the casing 9. The lever 39 is provided with a fork 40 (FIG. 6) supporting rollers 41 received in the annular groove 25. The mounting bracket 7 has an arm 42 with an axle 43. A cylinder 44 having ports 45 and 46 is pivoted on the axle 43. The cylinder 44 accommodates a piston 47 connected to a piston rod 48. The piston rod 48 is articulated to the pin 14. The cylinder 44 with the piston rod 48 is used for rotating the frames 12 approximately 45°, as best shown in FIGS. 5 and 6, and for locking them in two positions in which burners 49 and the dies 17 secured to the frames 12 are placed, in turn, in face of the points of moulding of the fixtures 18 (FIGS. 5 and 6). One die 17 and one burner 49 are mounted on each frame 12.

In addition, the mechanism 2 for moulding of the fixtures is provided with a vacuum source (not shown) which is connected, via the internal spaces of the axles 13 and passages 16 (FIG. 3) of the levers 15, to the die 17, as well as with a compressed air source (not shown)

connected to the cylinders 22, 35 (FIG. 2) and 44 (FIG. 5). The mechanism 2 is further provided with a fuel mix source (not shown) connected to the burners 49. For aligning the mechanism 2 relative to the moulds 5, the apparatus is provided with guides (not shown). The apparatus also has a control unit (not shown) for actuating various mechanisms of the apparatus in a desired sequence.

It is to be noted that other modifications of arrangement of the apparatus are possible in view of different construction of the automatic press 1 (FIG. 1), feeder (not shown) and pressing conditions which would characterize the operating sequence of the apparatus in each specific case.

In operation, a batch of molten glass from a feeder (not shown) is fed to the mould 5 (FIG. 1) which is placed at a station A. Then the table 4 is rotated counterclockwise and locked in the position in which the mould 5 containing the batch of molten glass is at a station under the pressing mechanism 6. The mechanism 6 performs the compression moulding of a screen blank B (FIG. 2). At the same time, another batch of molten glass is fed to another mould 5 which was placed at the position A (FIG. 1) as a result of the table rotation. Then the table 4 is again rotated counterclockwise to place the mould 5 with the moulded screen blank at a station under the mechanism 2 for moulding of the fixtures, and the mould 5 containing the batch of molten glass is transferred from the station A to the station under the pressing mechanism 6. Then the compression moulding of the next screen blank is effected by the pressing mechanism 6, a batch of molten glass is fed to the mould 5 placed at the station A, and the fixtures 18 are moulded in the screen blank B moulded during the preceding cycle. It is noted that in moulding the fixtures 18, the screen blank B remains in the same mould where it has been moulded, and adhesion forces are still acting between the moulded screen blank B and the mould 5. The screen B with the fixtures 18 is cooled in the same mould 5 during further cycles of operation of the apparatus.

The mechanism 2 for moulding of the fixtures operates with compressed air at 4–5.6 atm. fed to the cylinders 22 (FIG. 2) and 35, 44 (FIG. 5) to provide gauge pressure at the pistons 24, 38 (FIG. 2) and 38, 47 (FIG. 6), respectively.

Compressed air from the source (not shown) is fed through the port 36 (FIG. 2) to the cylinder 35. The piston 38 is displaced to pivot the lever 39 on the axle 34. The lever 39, in turn, causes the lowering of the casing 9 with the elements of the mechanism 2 supported thereon until the guide members of the casing 9 (not shown) rest against the end face of the mould 5 or against the cover of the cylinder 35. In this position, the burners 49 are placed in face of the points of moulding of the fixtures 18 as shown in FIG. 5.

Additional heating of the screen blank boards takes place (FIG. 2) at a temperature close to the temperature of molten glass fed to the mould 5. Then compressed air from the above-mentioned source is fed, via the port 45 (FIG. 5), to the cylinder 44. The piston 47 with the piston rod 48 is caused to displace to rotate, by means of the pin 14, the bushing 10. This, the frames 12 are placed into a locked position in which the dies 17 (FIG. 2) are placed in face of the heated portions of the screen boards B. Compressed air is fed, via the port 23, to the cylinder 22 from the compressed air source. The piston 24 with the piston rod 26 and spool 27 supported thereon is lowered to compress the spring 29. The spool 27 causes the displacement of the ends of the levers 15, and the levers 15 are pivoted on the axles 13. The dies 17 (FIG. 3) are pressed against the heated portions of the boards of the screen blank B in the mould 5. The vacuum source (not shown) provides reduced pressure of 0.5–0.7 atm. in the moulding cavity of the dies 17 (not shown), via the passages 16 of the levers 15 and passages 17' of the dies 17.

Due to the use of the dies 17 and the rarefaction created the heated glass of the board of the screen blank B fills the moulding cavity of the dies 17, and the fixtures 18 are thus moulded.

Then the compressed air source (not shown) is disconnected from the cylinder 22 (FIG. 2), and the air is exhausted into atmosphere through the port 23. The spring 29 is expanded to lift the piston 24 with the piston rod 26 and the spool 27. The spool 27 causes the rotation of the levers 15 about the axles 13. The dies 17 are spaced from the boards of the screen at a distance of 12–15 mm which is greater than the height of the fixtures 18 (FIG. 3). The compressed air is then exhausted into the atmosphere through the port 36 (FIG. 2) of the cylinder 35, and compressed air is fed to the same cylinder 35 through the port 37 from said compressed air source. The piston 38 is displaced to rotate the lever 39 about the axle 34 so that the mechanism 2 for moulding the fixtures is lifted to the upper position and the dies 17 with the burners 49 leave the mould 5. Then compressed aid is fed, via the port 46 (FIG. 6) to the cylinder 44 from the compressed air source, and the air is exhausted into atmosphere via the port 45. The piston 47 with the piston rod 48 is displaced to rotate the bushing 10 by means of the pin 14 so that the bushing is locked in the position in which the moulded fixtures 18 (FIG. 3) and the corresponding burners 49 (FIG. 4) are in the same vertical planes.

It should be noted that, at the same time with the moulding of the screen blank by the mechanism 6 (FIG. 1), molten glass is fed to the mould 5 which is at the station A, and the fixtures 18 are moulded in the screen blank B which is in the mould 5 placed under the mechanism 2, that is the manufacture of the screen with the fixtures is effected in the continuous manner.

What is claimed is:

1. An apparatus for manufacturing cathode-ray tube screens having integrally formed contoured fixtures for securing elements inside the screen, comprising means (5) arranged on a base (3) for holding said screen (B) and means for moulding said contoured fixtures (2) including a plurality of frames (12) each having mounted therein a heater (49) and a moulding tool 17; means for moving (12, 13, 15, 22-24, & 26-31) said moulding tools (17) from a radially retracted or inward position away from the screen surface to a radially extended or outward position pressing against said screen; means for vertically reciprocating (34-40) said contoured fixture moulding means from a position, wherein said heaters and tools face generally opposite to the surfaces where said contoured fixtures are to be formed to a position above the top of said mould holding said screen; and means (10, 14, & 42-48) for horizontally swinging in an arc or oscillating said frames (12) from a first locked position to a second locked position; whereby one of said locked positions enables said screen to be locally heated by said heaters at such surfaces where said contoured fixtures are to be formed, and the other of said locked positions enables said moulding tools to be moved toward said screen for impressing said contoured fixtures upon said screen.

2. The apparatus according to claim 1, wherein said moulding tools have projections on a die for forming recesses in the surface of said screen which serve as said contoured fixtures.

3. The apparatus according to claim 1, wherein said moulding tools have cavities in a die for forming projections on the surface of said screen which serve as said contoured fixtures, and wherein said die also includes passage means connected to vacuum means and to said cavities so as to provide a reduced pressure in said cavities of said die, whereby formation of said contoured fixtures is facilitated.

4. The apparatus according to claim 1, wherein said means for horizontally swinging in an arc or oscillating said frames comprising a cylinder (44) having a piston (47) and having a piston rod (48) connected to said piston, a pin (14) connecting a bushing (10), provided on said means for moulding said contoured fixtures (2) being pivotably connected to said piston rod (48), so as to cause said bushing to rotate about an angle less than 90° in a horizontal direction on both the expanding and retracting strokes of said piston of said cylinder; and said bushing supporting said frames in a fixed manner.

5. The apparatus according to claim 4, wherein said moulding tools move in a path forming an arc, and said means for moving said moulding tools including a lever pivotably mounted on a frame, about an axle for pivotably swinging said moulding tools about said axle and said lever including an end element engagable with an end of a piston rod of a cylinder, whereby said piston rod when moved causes said moulding tools to retract inwardly or to extend outwardly in an arc.

6. The apparatus according to claim 5, wherein said means for vertically reciprocating said contoured fixtures, includes a movable housing or casing enclosing said piston rod, and having a compression spring, for bearing support against said piston; said vertical reciprocating means also including pivotably actuated lever means power operated by means of a cylinder for reciprocating said movable housing or casing in a vertical direction to raise and lower said moulding tools.

* * * * *